350-96.29 SR
XR 3,701,131
I 1.30 17D

United States Patent [15] 3,701,131
Brauser et al. [45] Oct. 24, 1972

[54] MAGNETO-OPTIC STORAGE ELEMENT

[72] Inventors: Klaus J. Brauser, Baldham; Athanasios Kritikos; Walter Kroy, both of Munich; Walter E. Mehnert, Ottobrunn, all of Germany

[73] Assignee: Messeschmitt-Bolkow-Blohm GmbH, Munich, Germany

[22] Filed: June 1, 1970

[21] Appl. No.: 42,012

[30] Foreign Application Priority Data

June 18, 1969 Germany..........P 19 30 907.0

[52] U.S. Cl......340/174 YC, 250/227, 340/174.1 M, 350/96 R, 350/151

[51] Int. Cl........G11b 5/00, G02b 5/14, G02b 11/22

[58] Field of Search....340/174, 174.1 MO; 350/151, 350/227, 96 R; 250/227

[56] References Cited

UNITED STATES PATENTS

| | | | |
|---|---|---|---|
| 3,394,360 | 7/1968 | Miyata | 340/174.1 MO |
| 3,030,852 | 4/1962 | Courtney-Pratt | 340/174 |
| 3,224,333 | 12/1965 | Kolk, Jr. et al. | 340/174 |
| 3,164,816 | 1/1965 | Chang et al. | 340/174.1 MO |

OTHER PUBLICATIONS

MacDonald et al., IBM Tech. Disclosure Bulletin, Vol. 9, No. 12, May 1967, " Magneto-Optic Element." pp. 1,753 & 1,754. 340- 174.1 MO Ahn et al., IBM Tech. Disclosure Bulletin, Vol. 11, No. 6, Nov. 1968, " Magnetic Keeper and Passivation Layer for Beam Addressable Memory." pp. 611 and 612.

*Primary Examiner*—Maynard R. Wilbur
*Assistant Examiner*—Leo H. Boudreau
*Attorney*—Woodhams, Blanchard & Flynn

[57] ABSTRACT

Magneto-optic storage element for the storage of information. A nonconductive carrier, such as glass, is provided with a ferromagnetic metal or metal alloy coating which is in turn coated with an evaporated homogenous dielectric and optically transparent layer. An electromagnetic field is caused to surround the ferromagnetic layer. If plane-polarized light is reflected from the magnetic layer, the plane of polarization thereof is rotated due to the Kerr effect. If plane-polarized light penetrates the magnetic layer, same is then rotated due to the Faraday effect. The magnetization applied to the magnetic layer determines the rotation of e plane of polarization and same constitutes the input information. The rotation achieved for the output light constitutes the read out signal and same can be read by any analyzer capable of interpreting the plane.

7 Claims, 17 Drawing Figures

Figure 1:
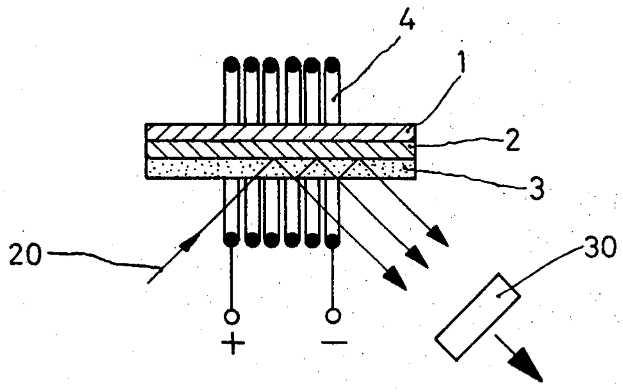

3701131
OR IN 340/174YC

INVENTORS
KLAUS J. BRAUSER
ATHANASIOS KRITIKOS
WALTER KROY
WALTER E. MEHNERT
BY Woodhams, Blanchard & Flynn
ATTORNEYS INVENTORS
KLAUS J. BRAUSER
ATHANASIOS KRITIKOS
WALTER KROY
WALTER E. MEHNERT
BY
Woodhams, Blanchard and Flynn
ATTORNEYS INVENTORS
KLAUS J. BRAUSER
ATHANASIOS KRITIKOS
WALTER KROY
WALTER E. MEHNERT
BY Woodhams, Blanchard and Flynn
ATTORNEYS INVENTORS
KLAUS J. BRAUSER
ATHANASIOS KRITIKOS
WALTER KROY
WALTER E. MEHNERT
BY
Woodhams, Blanchard & Flynn
ATTORNEYS INVENTORS
KLAUS J. BRAUSER
ATHANASIOS KRITIKOS
WALTER KROY
WALTER E. MEHNERT
BY
Woodhams, Blanchard & Flynn
ATTORNEYS INVENTORS
KLAUS J. BRAUSER
ATHANASIOS KRITIKOS
WALTER KROY
WALTER E. MEHNERT
BY
Woodhams, Blanchard and Flynn
ATTORNEYS

MAGNETO-OPTIC STORAGE ELEMENT

The invention relates to a magneto-optic storage element for the storage of information preferably for program or image storing systems.

Various different types of storage elements are already within the prior art. Apart from the so-called core storage arrangements, storage elements are known which are based on the principle of thermoplastic deformation of a surface layer. However, these arrangements of the prior art have relatively high read-in and access times.

Storage elements have further been proposed whose arrangement is based on the principle of the Josephson effect, i.e., an insulating layer is evaporated on a carrier plate which becomes superconductive at the operating temperature of the storage element. This insulating layer is in turn coated with a layer of superconductor type II material, which is superconductive at operating temperature. This layer contains magnetic particles in regular spacing which serve as an information carrier.

Even magneto-optic storage devices are within the prior art, and the Kerr effect, of which this invention makes use, has already been used to obtain information on the behavior of ferromagnetic materials in magnetic fields under physical effects.

However, the effect of this magneto-optic storage device of the prior art consists merely of rendering visible the magnetization of magnetic tapes through a magnetically adhesive powder and consequently varying forced reflection of light in differently magnetized sites.

Another method consists of reading information stored according to the tape method magneto-optically into a rotating ferromagnetic metal plate. The disadvantages of this known method are that information is read in according to the magnetic tape method and that it is read out magneto-optically, but through serial scanning of the stored contents by means of a fixed beam of light under which the information carrier is caused to pass. Thus mechanical motion of individual parts of the storage system is necessary. Parallel reading out or reading in is impossible.

The objective of the invention is to provide a storage element whose function is based on the magneto-optic Kerr effect and which constitutes a reprogrammable fixed storage device of high capacity within the smallest possible space. Serial as well as parallel reading in or out of the contents of this storage device must be possible. The invention achieves this by providing that a carrier, e.g., of glass, be provided with a ferromagnetic metal or metal alloy coating covered by an evaporated homogenous dielectric, optically transparent, layer and located in the electromagnetic field of an attached coil or conductor, so that, if plane-polarized light is reflected from the ferromagnetic layer, the plane of polarization of this light is rotated due to the Kerr effect, or, if the light penetrates the ferromagnetic layer, its plane of polarization is rotated due to the Faraday effect. The magnetization which causes the plane of polarization of the light to rotate constitutes the stored content which is read out by means of an analyzer.

These measures advantageously permit the use of light as well as non-binary storage. The information can be read out without being destroyed, the storage device can even be reprogrammed without erasing its contents.

The principle of the magneto-optic Kerr effect or alternatively the magneto-optic Faraday effect or also a combination of the two becomes effective in an appropriate geometrical-optical arrangement which intensifies these effects through multiple repetition (repeated reflection).

As is well known, the magneto-optic Kerr effect is based on the following principle: a plane-polarized beam of light strikes within an optically transparent medium a boundary surface consisting of a ferromagnetic layer. If the plane of polarization of the polarized light is parallel or perpendicular to the plane of incidence and if a magnetization vector parallel to the boundary surface and the plane of incidence is generated in the reflecting ferromagnetic boundary surface, the reflected light is polarized elliptically. This phenomenon may be considered to be caused by the fact that, if light is reflected, a so-called small Kerr vector is produced which is perpendicular to the light vector N of the reflected light (normal vector). The addition of these two vectors produces elliptically polarized light or, in first approximation, a slight rotation of the plane of polarization of the reflected light (5–20 angular minutes per reflection). If the light is reflected several times from such a boundary surface this rotation is intensified and can be measured by means of an analyzer inserted in the path of the rays.

The above-described Kerr effect is the so-called longitudinal Kerr effect which is produced by a magnetization vector parallel to the plane of incidence. Similarly the so-called transversal Kerr effect is produced by a magnetization vector in the reflecting boundary surface perpendicular to the plane of incidence of the light.

The Faraday effect is similar. Here the light beam passes through a homogenous transparent ferromagnetic medium, e.g., a a thin transparent ferromagnetic metal layer. If there is a magnetization vector parallel to the direction of propagation of the penetrating plane-polarized light beam here again the plane of polarization is rotated in proportion to the magnetization intensity and the thickness of the layer.

In all cases the sign of the magnetization device determines the sign of the angle of rotation. Consequently the angle of rotation of the analyzer can be selected in a manner that light passes through if the direction of magnetization is positive and does not pass through if it is negative.

As a further development of the invention it is suggested that optical fibers of glass or of another transparent dielectric be provided with a thin ferromagnetic coating which is in turn coated with an insulating dielectric layer. Finally a metal coil is wound around this coated fiber to serve as a magnetization coil. Both ends of this coil are properly connected with an electric generator. Many parallel optical fibers of this type are combined into, or by means of an insulating compound are cemented into a block, rod or plate to form a larger storage device. If, for example, the possible diameter of one coated fiber is 10 ym, storage blocks with upper appr. $10^4$ storage cells of this kind per $cm^2$ can be fabricated.

Another embodiment of the invention uses thin tubes consisting of a dielectric material (e.g., glass) instead of solid optical fibers. The tubes are coated on the inside with a ferromagnetic material, so that a thin ferromagnetic hollow waveguide is formed. The magnetization coil is located on the outside of the tube. The light to be influenced passes through the hollow waveguide and is multiply reflected.

Another embodiment provides that the above-described light conductor be provided with a single full-length conductive metal sheath. A current flowing parallel to the light conductor axis in the metal sheath also generates a magnetization vector in the ferromagnetic layer which is in this case tangential to the conductor cross section. Here again a measureable magneto-optic Kerr effect is produced which is utilized for information storage (transversal Kerr effect).

The above described magneto-optic effects are utilized in the arrangements according to the invention, where plane-polarized light is either passed through the analyzer or not, depending on the rotation of the plane of polarization which in turn depends on the magnetization, and where the stored content is determined by residual magnetization. The configuration of these arrangements provides that the said effects are intensified through multiple reflection of the light within each storage cell and that the storage cells are as small as possible so that a great number of these cells are combined into one plate or rod-like storage unit which can be readout by means of simultaneous illumination of all cells using an analyzer common to all cells (parallel reading) or by means of a controlled light beam (individual or serial reading).

It is moreover proposed to arrange the light conductor blocks within the magnetic field of one or several coils, to install a transparent photoelectric cathode in front of and parallel to the light entry side, and to accelerate the electrodes produced by exposure to light in the direction of the light entry side of the light conductors by means of an electric field perpendicular to this cathode.

It is further suggested that an arrangement may be provided which utilizes the Faraday effect for the storage of information. For this purpose the two faces of a glass rod are provided with a ferromagnetic coating surrounded by a dielectric protective layer, the ferromagnetic layer being of a thickness just permeable to light. The rod itself is surrounded by a coil whose direction of current is perpendicular to the light entry direction, the light entry side being provided with a polarizer and the light emission side with an analyzer.

In comparison with arrangements which utilize the Kerr effect the advantage of this arrangement is that it achieves greater rotation of the polarization plane of the light and consequently a greater brightness contrast of the information in the storage device.

Another embodiment provides that the front face of a dielectric light conductive rod (e.g., a glass rod) be provided with a partly permeable ferromagnetic reflecting layer covered by a dielectric non-reflecting protective layer, that the lateral face of this glass rod be surrounded by a coil in the familiar manner, and that two analyzers be arranged in a manner that one determines the rotation of the plane of polarization of the reflected light beams and the other determines that of the light beams passed through. It is moreover suggested that a multiplicity of storage elements be combined into one storage block.

Figure 2:
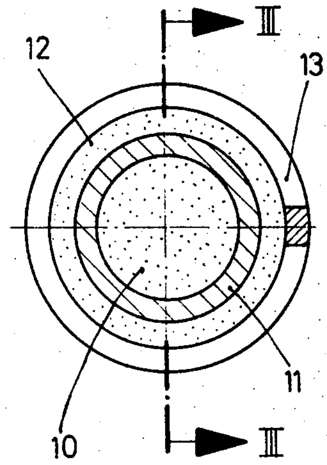
Figure 3:
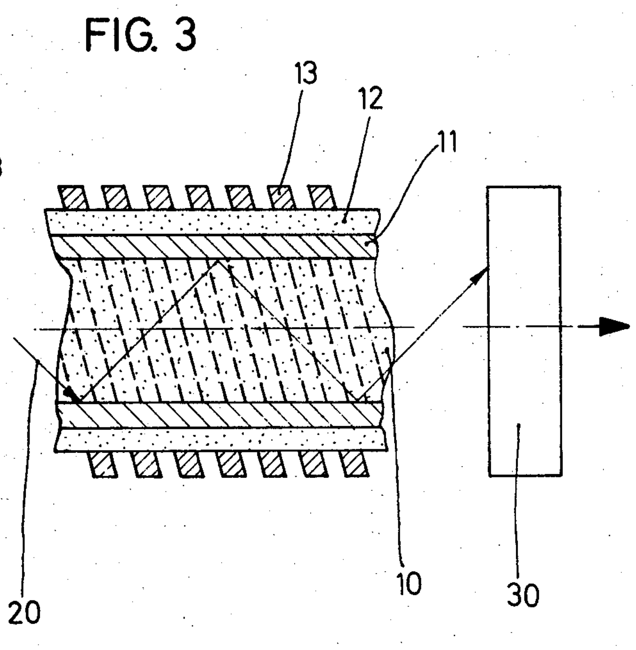
Figure 4:
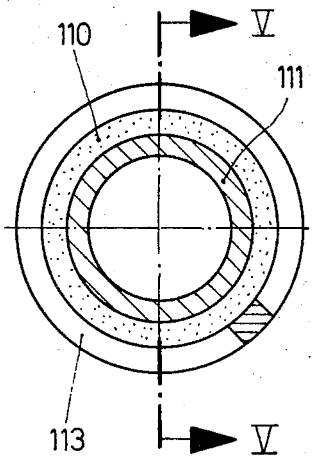
Figure 5:
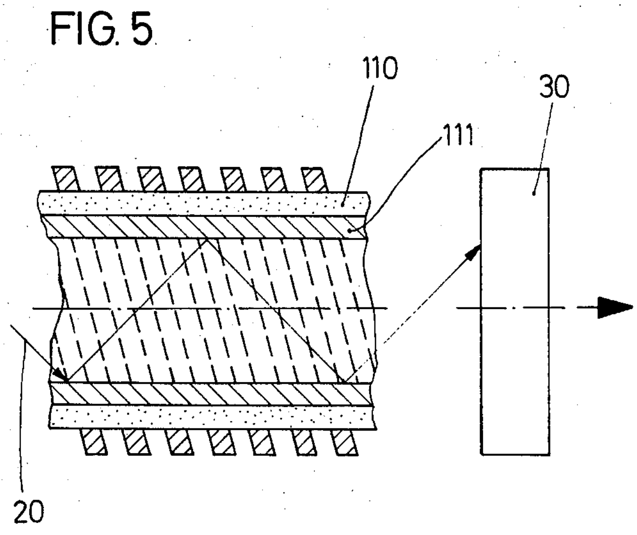
Figure 6:
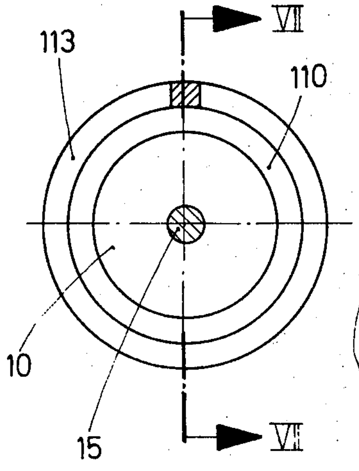
Figure 7:
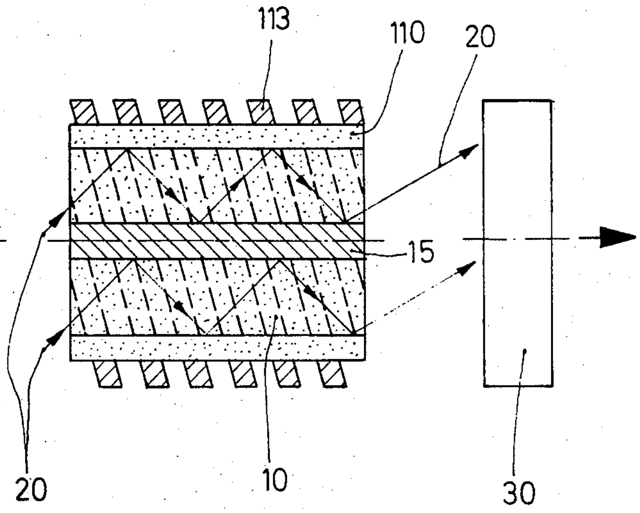
Figure 8:
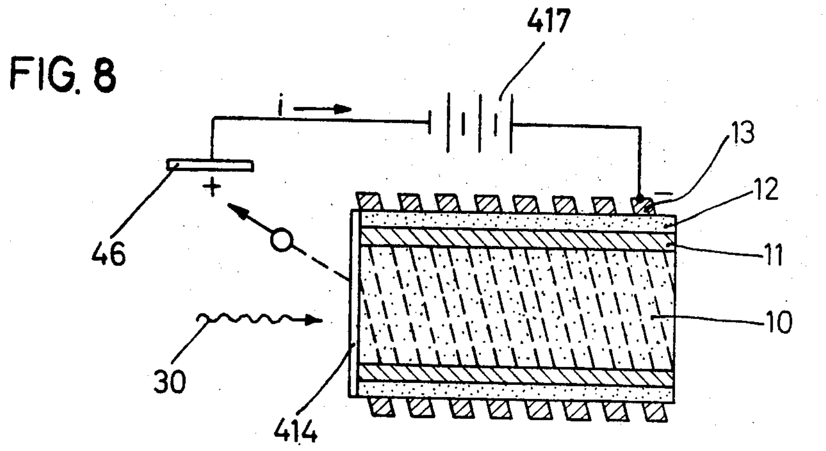
Figure 9:
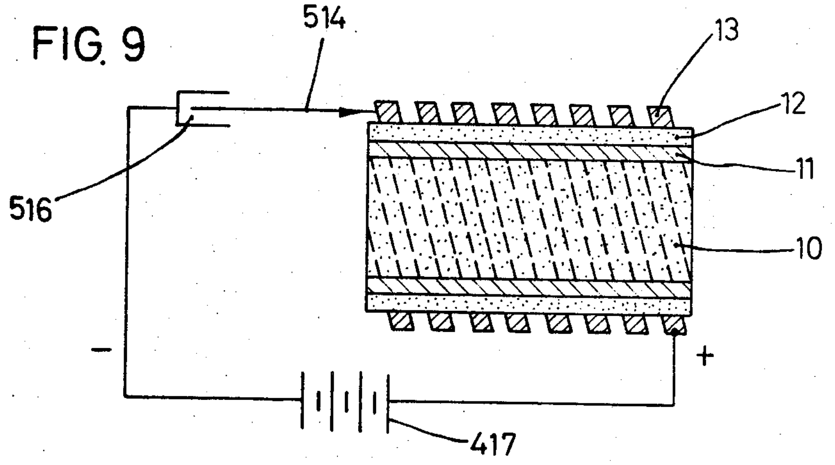

Other additional features and advantages of this invention will become apparent through reference to the following description and accompanying drawings:

FIG. 1 is a cross-sectional schematic illustration of the principal concept of the invention, FIG. 2 is a cross-sectional view of an embodiment of the invention, FIG. 3 shows a longitudinal section along the line III—III according to FIG. 2, FIG. 4 is a cross-sectional view of another embodiment of the invention, FIG. 5 shows a longitudinal section along the line V—V according to FIG. 4, FIG. 6 is a cross-sectional view of a third embodiment of the invention, FIG. 7 shows a longitudinal section along the line VII—VII according to FIG. 6, FIG. 8 is a schematic diagram illustrating the principle of storing information by means of light rays, FIG. 9 is a schematic diagram of the principle of storing information by means of electron beams.

Figure 10:
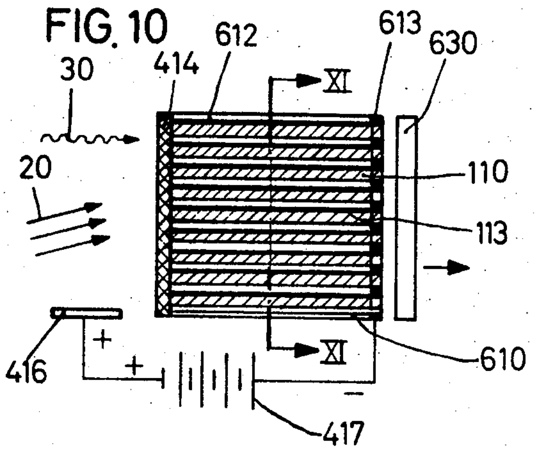
Figure 11:
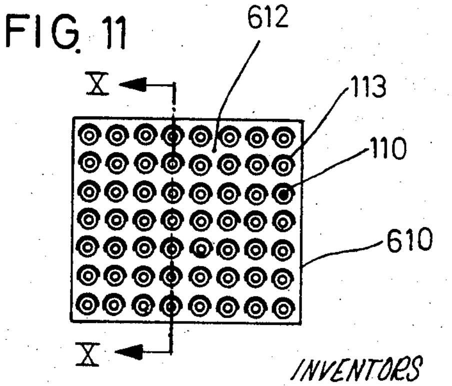
Figure 12:
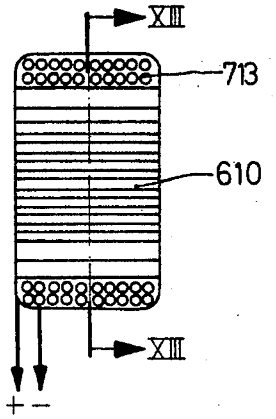
Figure 13:
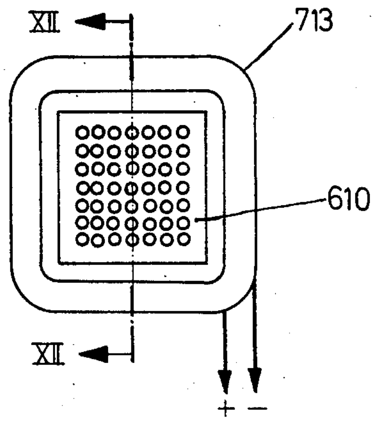
Figure 14:
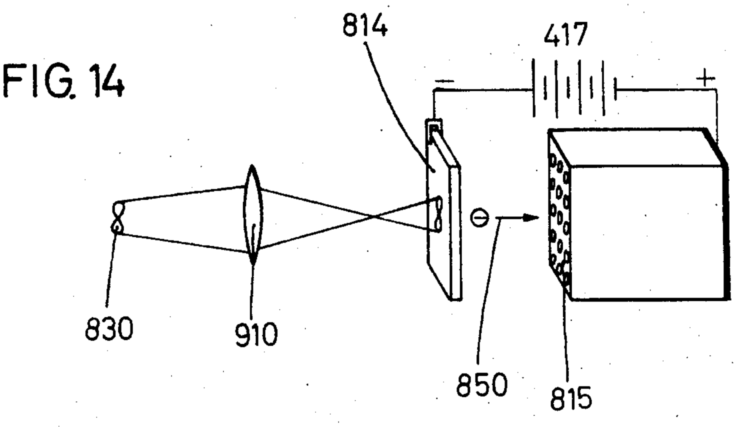
Figure 15:
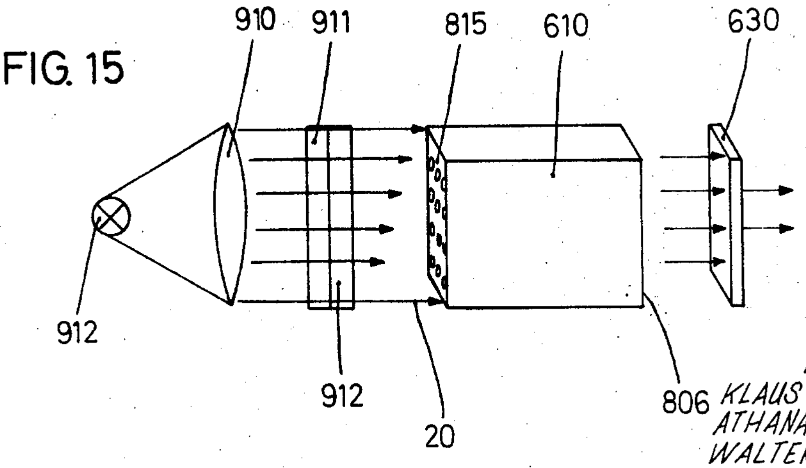
Figure 16:
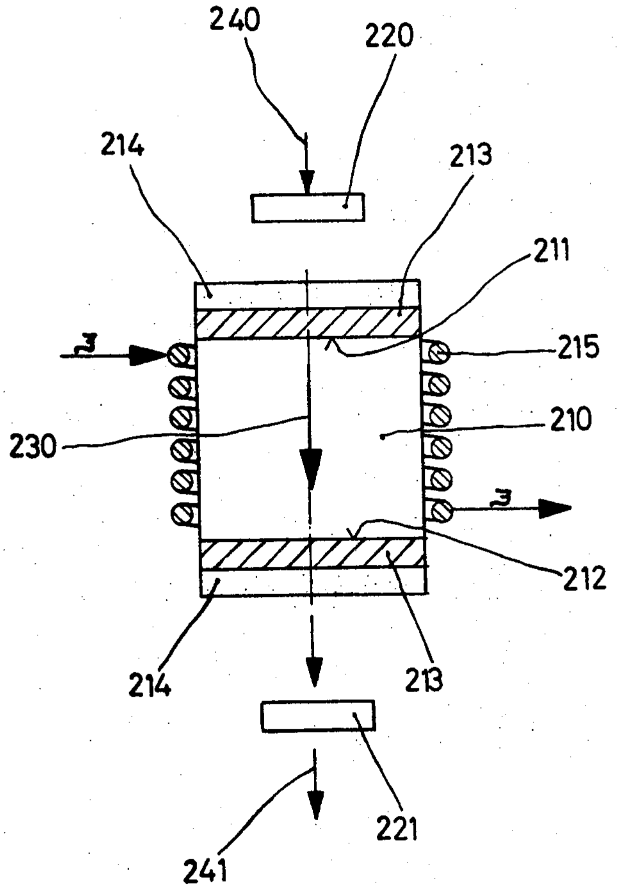
Figure 17:
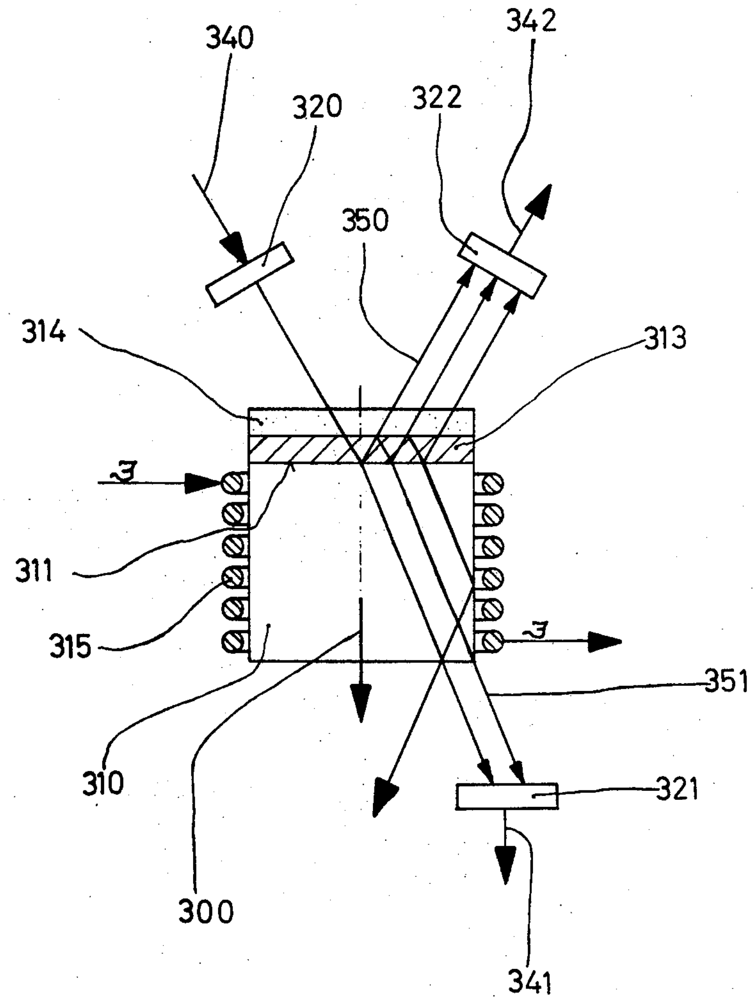

FIG. 10 shows a longitudinal section of a storage device constiting of storage elements, FIG. 11 shows a cross-section along the line XI—XI according to FIG. 10, FIG. 12 is a schematic diagram of an arrangement for premagnetization of the storage device as seen along the line XII—XII according to FIG. 13, FIG. 13 is a sectional view as seen along the line XIII—XIII according to FIG. 12, FIG. 14 is a schematic diagram showing the arrangement for the storage of data in a storage block using electron-optical transmission, FIG. 15 is a schematic diagram of the arrangement for reading information by means of light beams, FIG. 16 is a sectional view of a storage element and its arrangement according to a further embodiment of the invention, in schematic representation, FIG. 17 is a schematic diagram and a sectional view of another embodiment of the storage element according to the invention.

FIG. 1 shows the principle of the invention. A plane-polarized monochromatic beam of light 20 of suitable wavelength passes through a thin homogenous dielectric layer and strikes a reflecting layer 2 of ferromagnetic metal, the two layers being evaporated, for example, on a glass carrier 1. If the plane of polarization of the polarized light is parallel or perpendicular to the plane of incidence of the light, the polarization direction of the reflected light is actually rotated due to the Kerr effect when the light is reflected by the ferromagnetic metal surface if there is a magnetization vector. If the angle of incidence of the light is such that it is reflected several times in the dielectric 3 within the critical angle of total reflection, the kerr effect becomes effective with each reflection from the ferromagnetic layer, i.e. the plane of polarization is rotated each time. An analyzer 30 in a given location is only permeable to light whose plane of polarization has a specific rotation which corresponds, for example, to the residual magnetization in one direction. If this magnetization is reversed, the location of the analyzer attenuates the reflected light. In addition to the two possible directions of magnetization there are therefore two intensities of the light 20 passing through the fixed analyzer 30. Layer 3 is magnetized by means of a current impulse in the coil 4, the magnetization is reversed by means of a current impulse in the opposite direction. In both cases layer 3 retains a residual magnetization which is characteristic for thin layers and which corresponds nearly to the saturation magnetization.

FIGS. 2 and 3 show an embodiment of the invention. Here an optical fiber 10 is used as a carrier. The plane-polarized monochromatic light strikes this fiber, for example, at the polarization angle, and upon passing through the fiber 10 the beam of light 20 is reflected several times until it is emitted at the other end. A ferromagnetic metal coating 11 surrounding the fibers again causes the plane of polarization of the light 20 to rotate due to the magneto-optic Kerr effect as can be determined by means of the analyzer 30 in the above-described manner. Layer 11 is here magnetized by a coil 13, e.g., of copper, which is wound around the fiber and separated from the ferromagnetic layer 11 by an insulator 12.

Another embodiment of the invention is shown in FIGS. 4 and 5. Here a hollow wave guide 110 — e.g., of glass — is provided on the inside with a ferromagnetic coating 111, forming a thin tube of ferromagnetic material. The light beam 20 striking at a specific angle is again reflected several times. If layer 111 is magnetized the Kerr effect becomes effective and can be determined by means of the analyzer 30. The layer 111 is also magnetized by means of a conductor coil 13 surrounding the hollow wave guide 110.

FIGS. 6 and 7 show a schematic diagram of another variant of the invention. In this case the light conductor 10 contains a core wire 15 of ferromagnetic material and is surrounded by a dielectric transparent coating 110. If the refractive index of the coating 110 is taken to be $n_1$ and that of the light conductor 10 is assumed to be $n_2$, greater than $n_1$ there is total reflection at the exterior of the light conductor 10 of the light beams 20 passing through the material. At the interior of the light conductor 10 the beams of light 20 are metallically reflected by the boundary layer between the wire 15 and the light conductor 10 due to the Kerr effect if there is a magnetization vector. Here again the conductor coil 113 provides the necessary magnetization. As mentioned before the light beams 20 are monochromatic and plane-polarized.

Depending on their intended use, the geometrical dimensions of the light conductors and conductor coils according to FIGS. 2 and 6 can vary from several centimeters to a few $\mu$ in diameter and from several meters to a few millimeters in length. LIght conductors with diameters of $10\mu$ have already been fabricated. There are several possible ways of supplying the described storage elements with a magnetization current. For example, the ends of the conductor coils 13, 113 can each be connected to a conducting wire, which receives a recording current 416 from a recording current supply 417 in the usual manner.

A short current impulse is enough to produce a residual magnetization in the ferromagnetic reflecting layers 11, 15, 111, similarly a short impulse in the opposite direction reverses the residual magnetization. This reversing takes approximately $10^{-8}$ sec.

Another possibility of recording information is shown in FIG. 8, viz. by means of a beam of light 30. A beam of light striking a photo-sensitive layer 414 causes a photo-electric current to flow to the anode 46. The circuit is closed through the power source 417 and the conductor 13. If the intensity of the light is sufficient, the desired magnetization is produced. The same procedure can be used to reverse the magnetization if another coil — e.g., coil 713 as shown in FIG. 12 — has previously magnetized layer 11 in the opposite direction. The wave length of the light used for recording will usually be different from that of the reading beam 20, and the photo layer is only sensitive to the wave length of the recording beam 30. The arrangement of the photo layer 414 and the anode 46 is also possible in the form of a surface-type phototransistor having a current amplification effect.

FIG. 9 shows the possibility of recording by means of an electron beam. A controlled electron beam 514 strikes the conductor 13 and the magnetization circuit is closed through conductor 13, power source 417, cathode 516 and electron beam 514. The arrangements according to FIGS. 8 and 9 must be placed in a vacuum.

A large number of the above-described individual storage elements may be combined to form a single storage block 610. FIGS. 10 and 11 show a schematic view of such a storage block provided with an information recording device according to FIG. 8. An insulating sealing compound 612 is used to cement these storage elements 110 to form a block 610 having a volume, for example, of 1 ccm and containing 40,000 such conductor elements 110, each approximately 50 in dia. and 1 cm in length. A common conductor layer 613 connects all light emission ends, also called reading ends, of the individual elements, which are also in register with a common analyzer 630. The light entry side is covered by a segmented photo layer 414 which is connected to all conductors 113. If a recording light beam 30 or an area light pattern strikes one or, respectively, several segments of this photo layer the appropriate storage elements 110 are magnetized. When the reading beam 20 strikes the storage element the recorded information is made visible at the emission end and can be further processed.

A magnetization coil 713 surrounding the storage block 610 according to FIGS. 12 and 13 in such a manner that the magnetic field is parallel to the ferromagnetic reflecting layer 11, 111 of the storage elements 10, 110 is used to erase the information. As mentioned above, the photo layer 414 is insensitive but nevertheless permeable to the wave length of the reading beam 20.

Another recording method is shown in FIG. 14. Here a separated nonsegmented photo layer 814 is provided, which emits photo-electrons 850 when it is subjected to light patterns 830. These photo electrons are linearly accelerated in the direction of the light entry sides of the storage elements 815 and strike those storage elements arranged according to the brightness pattern. These elements are magnetized according to the procedure shown in FIG. 9.

FIG. 15 is a schematic diagram of the principle of parallel reading of a storage device. A light source 912 illuminates — through a capacitator 910 — a light filter consisting of a selective filter 911 and a polarizer 912. The light beams 20 strike the light entry side 815 of the storage block 610. The stored information is then made visible and measurable behind the analyzer 630 due to the different intensities of the transmission of the individual elements 110 and the analyzer.

FIG. 16 shows another embodiment of the invention. In this case the two front faces 211, 212 of a glass rod 210 are coated with a ferromagnetic layer 213 of a thickness just permeable to light 240. The ferromagnetic layer 213 is provided with a dielectric coating 214 which is nonreflective to the light on the light entry side.

The residual magnetization of the two ferromagnetic layers 213 is controlled by a current I flowing through the coil 215. The two directions of current induce two directions of residual magnetization in the ferromagnetic layers 213. These directions of magnetization are antiparallel to each other and perpendicular to the reflecting surface. A polarizer 220 is provided to polarize the monochromatic light. The polarized light strikes the layers 213, 214 at right angles, passes through these layers and is emitted at 212. The plane of polarization of the light passing through is rotated, this rotation is proportional to a material constant, to the thickness of the penetrated ferromagnetic layer and to the residual magnetization of this layer. An analyzer 221 is permeable to the light 241 rotated in a specific direction, light rotated in other directions does not pass through.

FIG. 17 shows a still further embodiment of the invention, which permits utilization of the Faraday effect as well as of the intensified Kerr effect. The front faces 311 of a dielectric glass rod 310 are provided with a partly permeable ferromagnetic reflecting coating 313 covered by a dielectric nonreflecting protective layer 314 which intensifies the Kerr effect. The longitudinal faces of the glass rod 310 are surrounded by a coil 315 whose current controls the residual magnetization of the ferromagnetic layer 313. The monochromatic light 340 striking at an angle is plane-polarized by means of the polarizer 320, the plane of polarization being perpendicular to the plane of incidence. The reflected light 350 is rotated at the ferromagnetic layer 313. The direction of the rotation is determined by the direction of the magnetization. However, the partly permeable ferromagnetic reflecting layer 313 transmits part of the incoming light beams (so-called transmitted light beams) through the glass rod 310 to the analyzer 321 which is only pervious to light rotated in a specific direction (341). Similarly an analyzer 322, which is again only pervious to light rotated in a certain direction (342), is provided for the reflected light beams 350. If a large number of the above-described storage elements is combined into one so-called storage block, this combination of the Faraday effect and the Kerr effect permits simultaneous serial and parallel reading of the magnetically stored information.

The embodiments of the invention in which an exclusive property or privilege is claimed are defined as follows:

1. A storage element positionable in the path of a polarized light beam for the storage of information therein, comprising:

means defining an elongated, nonmagnetically influenceable, light path adapted to transmit said light from one end thereof to the other end, said light path means comprising at least one elongated light conducting optical fiber;

ferromagnetic metal means defining a magnetizable magnetic layer in the path of said light beam and adapted to reflect said light beam, said ferromagnetic metal means comprising a ferromagnetic coating around the outside of said optical fiber;

a diaelectric coating around the outside of said ferromagnetic coating; and elongated coil means for generating an electromagnetic field surrounding said light path and said magnetic layer, said electromagnetic field magnetizing said magnetic layer to effect a rotation of the plane of polarization of said light beam by the Kerr effect when said polarized light strikes said magnetized layer, the amount of said rotation being proportional to the intensity of said magnetization of said magnetic layer.

2. A storage element according to claim 1, wherein said coil means comprises an electrical current conductor and control means for supplying electrical current to said conductor.

3. A storage element according to claim 2, wherein said control means comprises a photo-electric transparent layer mounted on said one end of said light conducting optical fiber, the wave length of energy produced by said photo-electric layer being different from said light beam;

wherein said current conductor is connected at one end to said photo-electric layer; and including an anode plate positioned in the path of said energy path from said photo-electric layer when said photo-electric layer is struck by said light beam, said anode plate being connected to the positive terminal of a power source and the other end of said current conductor being connected to the negative terminal of said power source.

4. A storage element according to claim 1, including a plurality of said storage elements in a block of insulation material.

5. A storage element according to claim 1, wherein said coil means comprises a conductor system in the form of a matrix.

6. A storage element positionable in the path of a polarized light beam for the storage of information therein, comprising:

means defining an elongated, nonmagnetically influenceable, light path adapted to transmit said light from one end thereof to the other end, said light path means comprising an elongated hollow light conduction optical fiber;

ferromagnetic metal means defining a magnetizable magnetic layer in the path of said light means and adapted to reflect said light beam, said ferromagnetic metal means including an elongated ferromagnetic rod filling the hollow interior of said hollow light conducting optical fiber;

elongated coil means encircling said hollow light conducting optical fiber for generating an electromagnetic field surrounding said light path and said magnetic layer, said electromagnetic field magnetizing said magnetic layer to effect a rotation of the plane of polarization of said light beam by the Kerr effect when said polarized light strikes said magnetized layer, the amount of said rotation being proportional to the intensity of said magnetization of said magnetic layer; and a diaelectric coating around the outside of said hollow light conducting optical fiber and disposed between said optical fiber and said coil means.

7. A storage element according to claim 6, wherein said dielectric coating is transparent.

* * * * *